United States Patent
McDonough et al.

(10) Patent No.: US 6,959,033 B1
(45) Date of Patent: Oct. 25, 2005

(54) SYSTEM AND METHOD FOR ASSIGNING COMBINER CHANNELS IN SPREAD SPECTRUM COMMUNICATIONS

(75) Inventors: John G. McDonough, La Jolla, CA (US); Craig M. Julian, Escondido, CA (US)

(73) Assignee: Texas Instruments Incorporated, Dallas, TX (US)

( * ) Notice: Subject to any disclaimer, the term of this patent is extended or adjusted under 35 U.S.C. 154(b) by 536 days.

(21) Appl. No.: 09/648,122

(22) Filed: Aug. 25, 2000

(51) Int. Cl.⁷ .......................... H04B 15/00; H04K 1/00; H04L 27/30
(52) U.S. Cl. ...................................... 375/147; 370/342
(58) Field of Search ............................... 375/130, 140, 375/144, 143, 147, 148, 150, 152, 260, 259, 375/267, 347, 349; 370/329, 335, 342, 345, 370/431, 437, 438, 441, 464, 479, 498

(56) References Cited

U.S. PATENT DOCUMENTS

| | | | | |
|---|---|---|---|---|
| 4,901,307 | A | | 2/1990 | Gilhousen et al. ............ 370/18 |
| 5,056,109 | A | | 10/1991 | Gilhousen et al. ............. 375/1 |
| 5,101,501 | A | | 3/1992 | Gilhousen et al. ............ 455/33 |
| 5,103,459 | A | | 4/1992 | Gilhousen et al. ............. 375/1 |
| 5,109,390 | A | | 4/1992 | Gilhousen et al. ............. 375/1 |
| 5,228,054 | A | | 7/1993 | Rueth et al. .................... 375/1 |
| 5,237,586 | A | | 8/1993 | Bottomly ........................ 375/1 |
| 5,267,261 | A | | 11/1993 | Blakeney, II et al. ........... 375/1 |
| 5,267,262 | A | | 11/1993 | Wheatley, III .................. 375/1 |
| 5,305,349 | A | | 4/1994 | Dent .............................. 375/1 |
| 5,383,219 | A | | 1/1995 | Wheatley, III et al. .......... 375/1 |
| 5,414,728 | A | | 5/1995 | Zehavi ........................ 375/200 |
| 5,490,165 | A | * | 2/1996 | Blakeney et al. ........... 370/335 |
| 5,625,876 | A | * | 4/1997 | Gilhousen et al. .......... 370/331 |
| 5,684,793 | A | | 11/1997 | Kiema et al. |
| 5,812,542 | A | * | 9/1998 | Bruckert et al. ............. 370/335 |
| 5,859,840 | A | * | 1/1999 | Tiedemann et al. ......... 370/335 |
| 5,867,527 | A | * | 2/1999 | Ziv et al. ..................... 375/147 |
| 5,903,550 | A | | 5/1999 | Spock ........................ 370/335 |
| 5,987,076 | A | | 11/1999 | Zehavi et al. ............... 375/340 |
| 6,097,954 | A | * | 8/2000 | Kumar et al. ............... 455/442 |
| 6,298,050 | B1 | * | 10/2001 | van Heeswyk et al. ..... 370/335 |
| 6,507,568 | B2 | * | 1/2003 | Kumar et al. ............... 370/329 |
| 6,532,252 | B1 | * | 3/2003 | Moon et al. ................. 375/144 |
| 6,678,311 | B2 | * | 1/2004 | Odenwalder ................ 375/147 |
| 2001/0043578 | A1 | * | 11/2001 | Kumar et al ................ 370/331 |
| 2002/0191682 | A1 | * | 12/2002 | Moon ......................... 375/147 |

FOREIGN PATENT DOCUMENTS

| | | |
|---|---|---|
| EP | 0 691 754 A2 | 1/1996 |
| EP | 0 825 727 A1 | 2/1998 |

OTHER PUBLICATIONS

Search report Oct. 27, 2003.

* cited by examiner

*Primary Examiner*—Jean B. Corrielus
(74) *Attorney, Agent, or Firm*—Ronald O. Neerings; Wade James Brady, III; Frederick J. Telecky, Jr.

(57) ABSTRACT

A method for providing combiner channel assignments, with the soft symbols of corresponding demodulated information channels, is presented. The grouping of combiner channel assignments with the soft symbols permits any information channel to be associated with any finger channel without additional communications being required between a controller and the combiner. Once the demodulating finger is programmed with a combiner channel assignment for each finger channel, the assignment of finger channel outputs to combiner channels is regulated in the flow of communications between the combiner and the demodulating finger. A system for assigning combiner channels with the soft symbol outputs of a demodulating finger is also provided.

27 Claims, 4 Drawing Sheets

FIG. 5

| INFORMATION CHANNEL 1 | COMBINER CHANNEL 1 | DEMOD FINGER A/FINGER CHANNEL 1 |
| | | DEMOD FINGER B/FINGER CHANNEL 2 |
| | | DEMOD FINGER m/FINGER CHANNEL n |
| INFORMATION CHANNEL 2 | COMBINER CHANNEL 2 | DEMOD FINGER A/FINGER CHANNEL 2 |
| | | DEMOD FINGER B/FINGER CHANNEL 1 |
| | | DEMOD FINGER m/FINGER CHANNEL 2 |
| ⋮ | ⋮ | ⋮ |
| INFORMATION CHANNEL n | COMBINER CHANNEL n | DEMOD FINGER A/FINGER CHANNEL n |
| | | DEMOD FINGER B/FINGER CHANNEL n |
| | | DEMOD FINGER m/FINGER CHANNEL 1 |

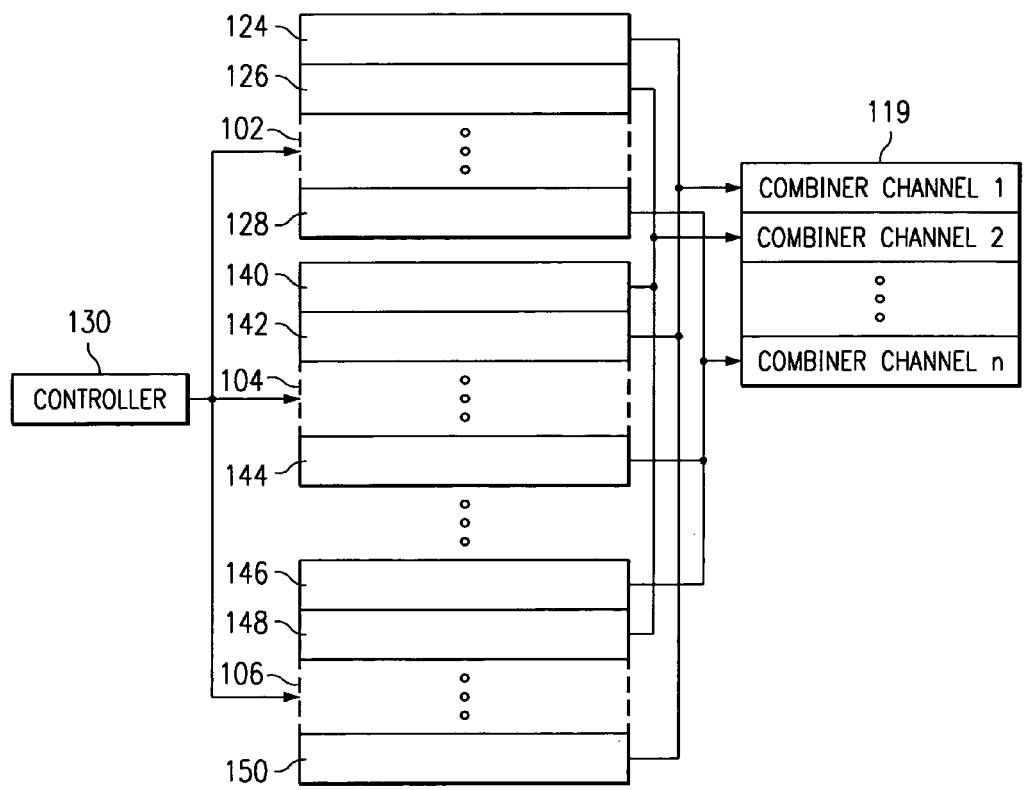

FIG. 6

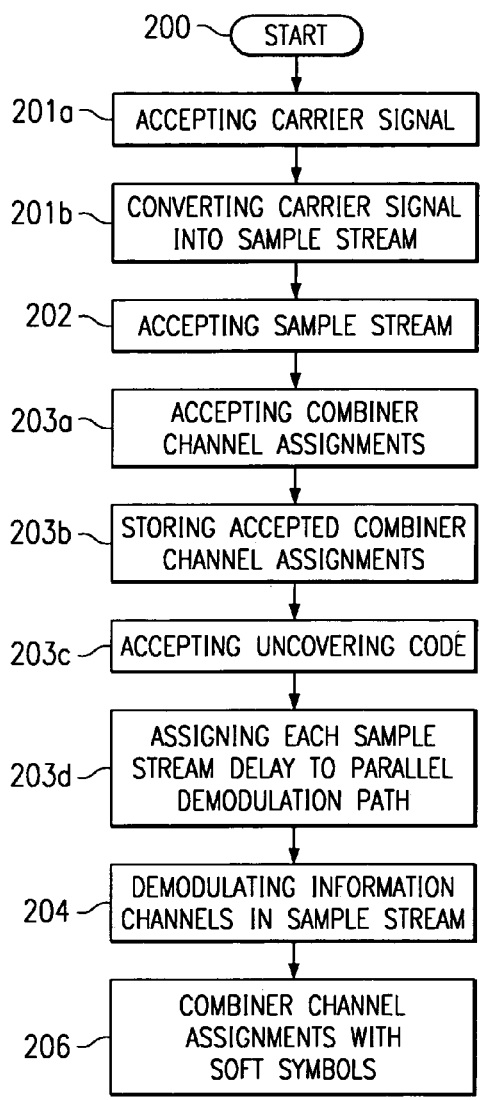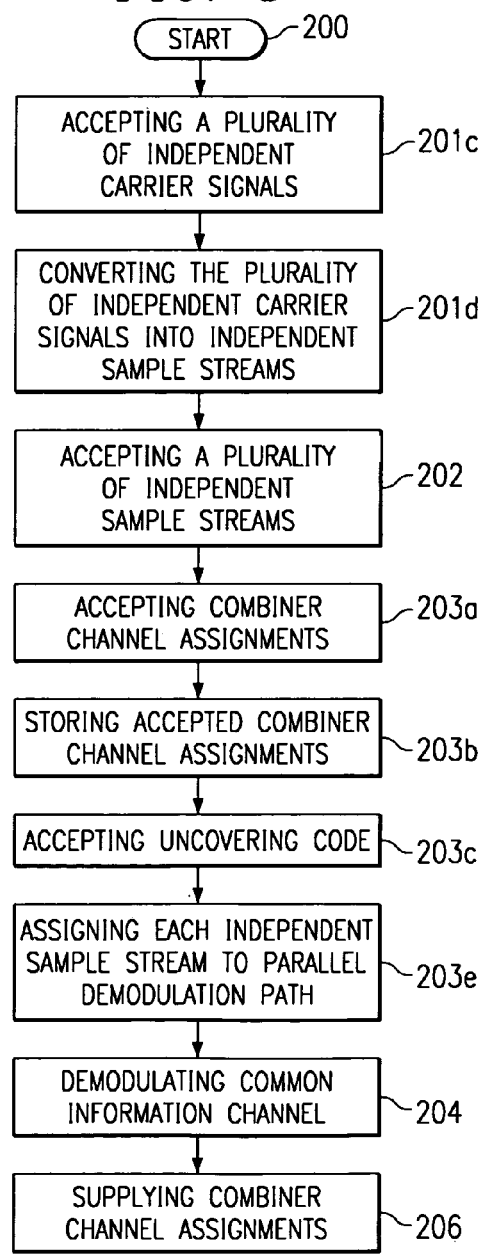

SYSTEM AND METHOD FOR ASSIGNING COMBINER CHANNELS IN SPREAD SPECTRUM COMMUNICATIONS

BACKGROUND OF THE INVENTION

The present invention relates generally to the field of spread spectrum communications and, more particularly, for assigning combiner channels to the soft symbols of an information channel following demodulation in a code division multiple access (CDMA) RAKE receiver.

In spread spectrum communications, such as in CDMA systems, pseudorandom noise (PN) sequences are used to generate spread spectrum signals by increasing the bandwidth (i.e., spreading) of a baseband signal. A forward link waveform transmitted by the base station may be comprised of a pilot waveform and a data waveform. Both of the waveforms are received with the same relative phase and amplitude distortions introduced by the channel. The pilot waveform is an unmodulated PN sequence which aids in the demodulation process, as is well-known in the art as "pilot-aided demodulation." Conventional pilot-aided demodulation methods typically include the steps of (i) demodulating the pilot waveform, (ii) estimating the relative phase and amplitude of the pilot waveform, (iii) correcting the phase of the data waveform using the estimated phase of the pilot waveform, and (iv) adjusting the weight of data symbols used in maximal ratio combining in a RAKE receiver based on the estimated amplitude of the pilot waveform. Steps (iii) and (iv) above are performed as a "dot product" as is known in the art. Conventionally, steps (i) through (iv) are performed in hardware. In some conventional methods, a controller having a central processing unit (CPU) and and/or a digital signal processor (DSP) performs some of the above-described steps.

FIG. 1 illustrates a conventional IS-95 forward link base station transmitter 10 (prior art). A pilot channel 12 is generated that has no data. That is, the data is predetermined to be all "0" bits. The pilot channel is modulated, or covered with a Walsh code from Walsh code generator 14 at 1.2288 Mcps (megachips per second). 64 orthogonal Walsh codes, each of 64 bits, are used in the IS-95A and 95B systems. Walsh code $H_0$ is used to modulate the pilot channel.

Also depicted is a traffic or paging channel, which shall be referred to herein as an information channel. Data is input at one of a plurality of data rates from 9.6 kbps (kilobits per second) to 1.2 kbps. The data is encoded at encoder 16, at one bit per two code symbols, so that the output of the encoder 16 varies from 19.2 ksps (kilosymbols per second) to 2.4 ksps. Symbol repetition device 18 repeats the codes from 1 to 8 times to create a 19.2 ksps signal. Alternately stated, either 1, 2, 4, or 8 modulation symbols are created per code symbol. Then, the information channel is scrambled with a long code at the same 19.2 ksps rate. Other rates are described in the IS-2000 standard. The information channel is covered with a different Wash code from that used to cover the pilot channel, code $H_T$ for example.

After being modulated with Walsh codes, each channel is spread with a common short code, or PN sequence. Each channel is split into I and Q channels, and spread with I and Q channel PN sequences. A 90 degree phase shift is introduced by multiplying the I channels with a sin function, while the Q channel is being multiplied with a corresponding cosine function. Then, the I and Q channels are summed into a QPSK channel. In the IS-95 standard, the same baseband symbols are assigned to both the I and Q channels. The combination of all the QPSK channels, including pilot, synchronization, paging, and traffic channels can be considered a composite waveform. This composite waveform is then up-converted in frequency (not shown) and transmitted.

FIG. 2 is a conventional IS-95 CDMA receiver (prior art). At the mobile station receiver 50 the transmitted signals are accepted as analog information, split into I and Q channels, multiplied respectively by sin and cosine functions, and converted into a digital I and Q sample stream at A/D 52. Conventionally, a multi-finger RAKE is used to resolve multipath variations, or delays in the sample stream, so that degradation due to fading can be minimized. Three demodulating fingers, demodulating finger 1 (54), demodulating finger 2 (56), and demodulating finger 3 (58) all receive the same I and Q sample stream, which has been represented as a single line for simplicity. Each demodulating finger is assigned one of the sample stream multipath delays. PN codes and Walsh codes are generated with delays consistent with the multipath delays of the sample stream to be demodulated. The sample stream from the multipaths is coherently combined in combiner 60 based on a maximal ratio combining (MRC) principle.

The receiver 50 may also receive the same sample stream from more than one base station. The base stations are precisely timed and synchronized using offsets of the PN spreading code. That is, the same sample stream received from two different base stations is offset by delays that are typically much larger than multipath delays. The receiver 50 has diversity characteristics which permit it to demodulate the sample stream from two different base stations, for the purposes of a handoff for example.

In some conventional CDMA RAKE receivers, the outputs of multiple demodulating fingers are "hardwired" to combine the common information channels in a sample stream. The decision and data transfer operations of the individual finger channels are predetermined. Hardwiring reduces flexibility, as the finger channels of the demodulating fingers must always be combined with the same partner finger channels. As shown in FIG. 2, the first finger channel of each demodulating finger is permanently connected to the first combiner channel. Likewise, the second and third finger channels of each demodulating finger are connected, respectively, to the second and third combiner channels. Thus, the number of information channels, the information channel order, and the information channels that can be combined across demodulating fingers are necessarily constricted when the finger channel outputs are connected in a hardwired arrangement. Hardwiring does not permit partner finger channels to be used with different combiner channels. Such a configuration necessitates the use of many demodulating fingers to process IS-2000 standard communications, as the standard includes sample streams with many information channels. A receiver with a fixed number of finger channels in each demodulating finger can only demodulate such a fixed number of IS-2000 standard information channels.

Alternately, the soft symbols output by the demodulating finger can be buffered and transferred, via a data bus, to a CPU or DSP for combining. This software combining approach provides flexibility, as potentially the finger channels can be combined in any variation. However, the CPU or DSP may not have enough bandwidth to compete with the speed of the hardware combining solutions, nor will such solutions prove power efficient.

It would be advantageous if a CDMA RAKE receiver could be devised with great flexibility in the assignment of information channels to finger channels and demodulating fingers.

It would be advantageous if the subsequent combining of the soft symbols output by finger channels in a demodulating finger could be varied in response to the number of information channels in a sample stream.

It would be advantageous if the soft symbols output by finger channels in a plurality of demodulating fingers could be flexibly combined so that finger channels were not teamed together in permanent relationships.

It would be advantageous if the soft symbols of demodulated information channels could be flexibly combined without significant processor steps or large amounts of system overhead to store and direct the transfer of these soft symbols.

SUMMARY OF THE INVENTION

Accordingly, in a spread spectrum communications integrated circuit receiver, a system for demodulating a plurality of information channels in a sample stream is provided. The system comprises a plurality of demodulating fingers, where each demodulating finger accepts a sample stream, supplies soft symbols from demodulated information channels, and supplies combiner channel assignments for the soft symbols. The demodulating finger accepts combiner channel assignments, and assigns combiner channels to soft symbols in response to the accepted combiner channel assignments. Each demodulating finger further includes at least one channel register to accept, store, and supply the combiner channel assignments with the soft symbols. More specifically, the combiner channel assignments are accepted, and then supplied by the demodulating finger which supplies the soft symbols of the corresponding demodulated information channels. That is, each demodulating finger supplies the channel assignments for the soft symbols that it outputs. Preferably, a controller supplies the combiner channel assignments to the plurality of demodulating fingers, where each combiner channel assignment respectively corresponds to an information channel.

Each demodulating finger includes a plurality of finger channels. Each finger channel demodulates a particular information channel and then, supplies the soft symbols from that demodulated information channel. Preferably, each finger channel includes its own channel register to supply the combiner channel assignment corresponding to its demodulated information channel soft symbols.

When the integrated circuit receiver accepts a sample stream, with a plurality of sample stream (multipath) delays, each sample stream delay is processed by a corresponding demodulating finger. The sample stream delays include common information channels. Each demodulating finger assigns soft symbols from a common demodulated information channel to the same combiner channel. Alternately, when the receiver accepts a plurality of independent sample streams including a common information channel, each independent sample stream is processed by a corresponding demodulating finger, and each demodulating finger assigns soft symbols from the common demodulated information channel to the same combiner channel.

A method for combining a plurality of demodulated information channels in a sample stream is also provided. The method comprises: accepting a sample stream; demodulating information channels in the sample stream; and, supplying combiner channel assignments with the soft symbols of the demodulated information channels. As above, the combiner channel assignments correspond to information channels.

BRIEF DESCRIPTION OF THE DRAWINGS

FIG. 5 illustrates an exemplary combiner channel map, such as might be used by the controller to organize the assignment of information channels, through demodulating finger channels, to common combiner channels.

FIG. 6 is a schematic diagram which illustrates the results of the exemplary combiner channel map of FIG. 5.

FIG. 7 is a flowchart illustrating a method for combining a plurality of demodulated information channels in a sample stream, in a spread spectrum communications integrated circuit receiver.

FIG. 8 is a flowchart illustrating a variation of the method of FIG. 7.

DETAILED DESCRIPTION OF THE PREFERRED EMBODIMENTS

Figure 3:
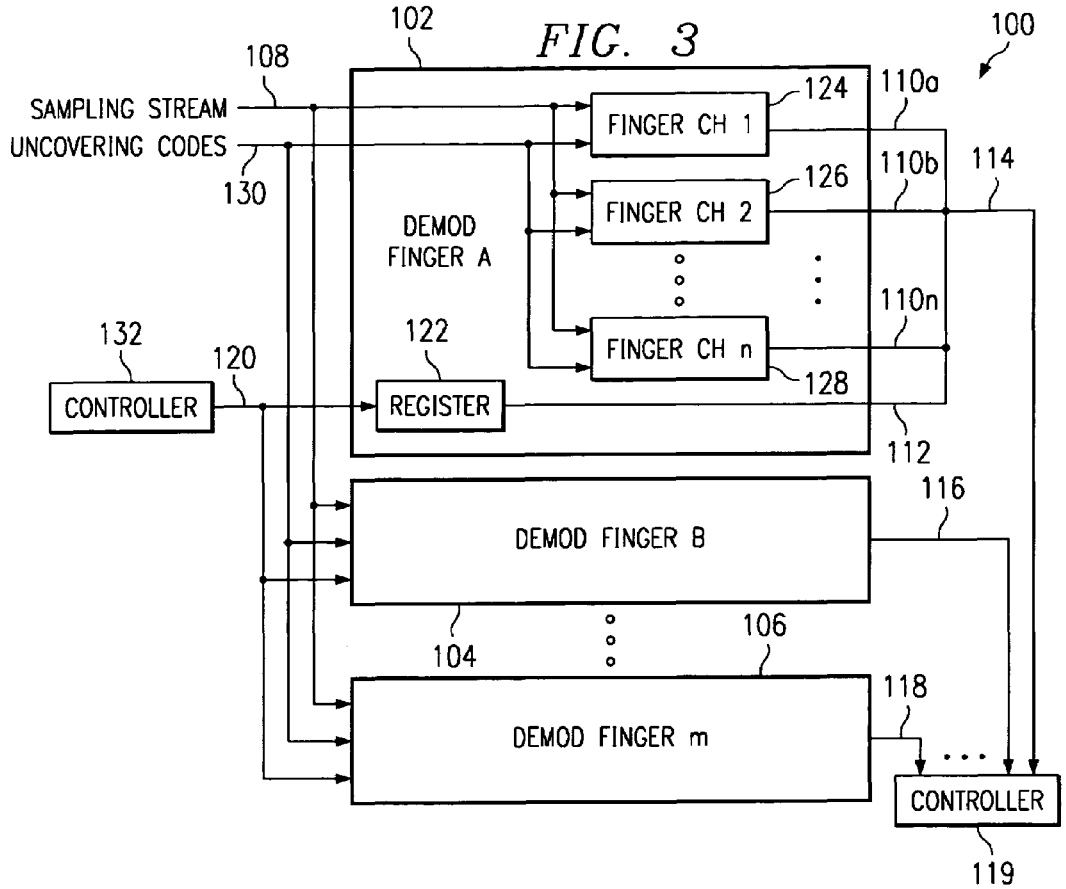
FIG. 3 is a schematic block diagram illustrating the present invention system for supplying combiner channel assignments for a plurality of demodulated information channels in a sample stream.

FIG. 3 is a schematic block diagram illustrating the present invention system for supplying combiner channel assignments for a plurality of demodulated information channels in a sample stream. The system 100 is typically of use in a spread spectrum receiver, such as a direct sequence spread spectrum (DSSS) CDMA RAKE. Although the receiver is shown implemented as a collection of distinct hardware blocks it should be understood that the receiver is typically fabricated in a single integrated circuit (IC), or a family of cooperating ICs. System 100 includes a plurality of demodulating fingers. Demodulating fingers A (102), demodulating finger B (104), and demodulating finger m (106) are shown, where m can be any whole number. That is, the present invention is not limited to any particular number of demodulating fingers, although in a preferred aspect of the invention m=6.

Figure 1:
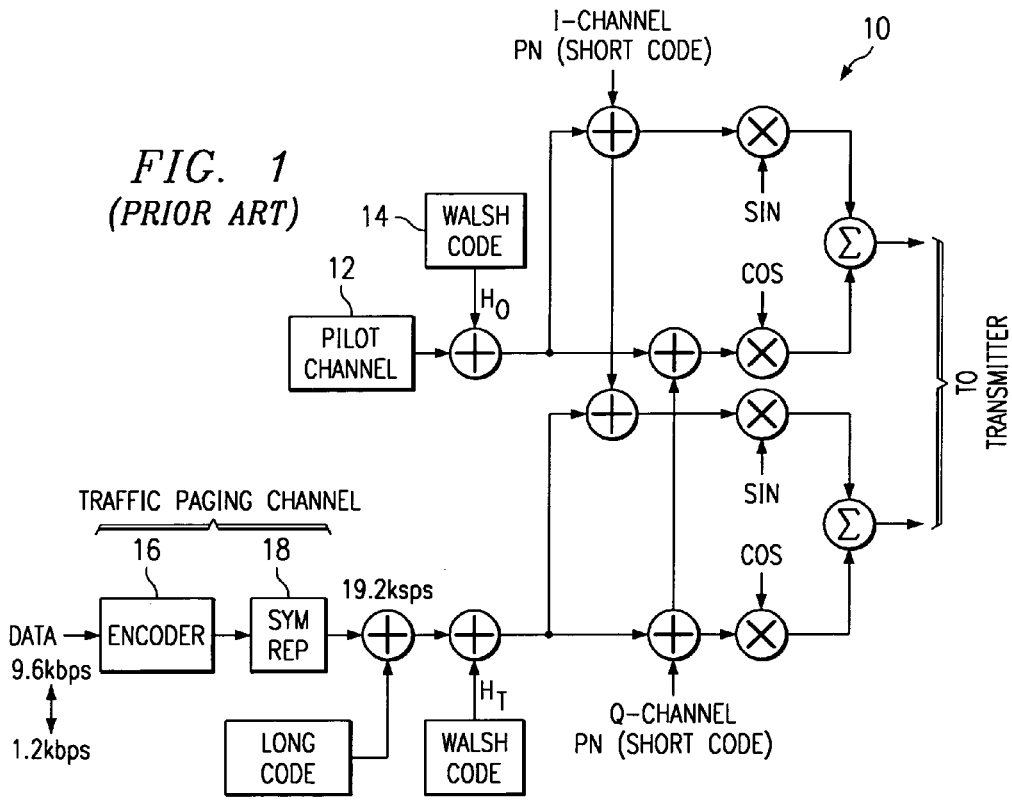
FIG. 1 illustrates a conventional IS-95 forward link base station transmitter (prior art).
Figure 2:
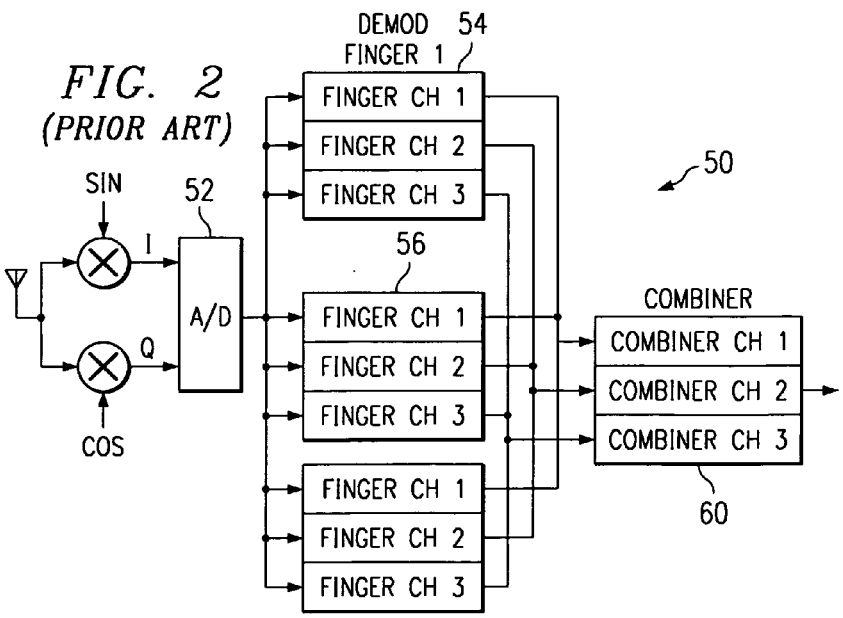
FIG. 2 is a conventional IS-95 CDMA receiver (prior art).

Each demodulating finger, where demodulating finger A (102) is representative of the other demodulating fingers, accepts a sample stream input as defined in the explanation of FIG. 2, at a sample stream input. The sample stream includes a plurality of information channels, which can include traffic, paging, synchronization, and pilot channels. It is understood that the information channels in the sample stream include I and Q components, however for the sake of simplicity, the sample stream on line 108 is represented as a single line. Demodulating finger A (102) has soft symbol outputs to supply demodulated information channel soft symbols on lines 110*a*, 110*b*, through 110*n*, where n can be any whole number. The invention is not limited to any particular number of soft symbol outputs. The soft symbol outputs correspond to finger channels, as explained below. Demodulating finger A (102) also has a combiner channel assignment output on line 112. Typically, the information on lines 110*a*, 110*b*, 110*n*, and 112 is combined in a bus, represented by line 114. Similar output lines (buses) 116 and 118 exist for demodulating finger B (104) and demodulating finger m (106), respectively, for connection to combiner 119.

The combiner channel assignments are received by demodulating finger A (102) at a combiner channel assignment input on line 120, which is also connected to demodulating finger B (104) and demodulating finger m (106). The assignment of combiner channels by demodulating finger A (102) to the output soft symbols is responsive to the combiner channel assignments accepted on line 120. It should be understood that lines 114, 116, and 118 represent configurable information flow, and are not hardwired connections as described in the explanation of the prior art in FIG. 2. For example, a digital information bus may connect all the demodulating finger outputs to the combiner input. The information supplied by each demodulating finger can be a message that includes a portion for data (soft symbols) and a portion for address (combiner channel).

Demodulating finger A (102) includes at least one channel register 122 having an input connected to the demodulating finger combiner channel input on line 120 to accept combiner channel assignments. The channel register 122 has an output coupled to the demodulating finger combiner channel assignment output on line 112, and ultimately line 114, to supply stored combiner channel assignments. Demodulating finger A (102) supplies combiner channel assignments from a plurality of possible combiner channel assignments. Each combiner channel assignment corresponds to a particular information channel from plurality of information channels.

Demodulating finger A (102) further includes a plurality of finger channels. Finger channels 1 (124), finger channel 2 (126), through finger channel n (128), where n can be any whole number, are shown, although the present invention is not limited to any particular number of finger channels. As shown in the figure, each finger channel 124–128 has a sample stream input coupled to the demodulating finger sample stream input to accept the sample stream on line 108. Each finger channel 124–128 also includes a soft symbol output connected to the demodulating finger soft symbol output on lines 110*a*–110*n* to supply soft symbols from a demodulated information channel.

Figure 4:
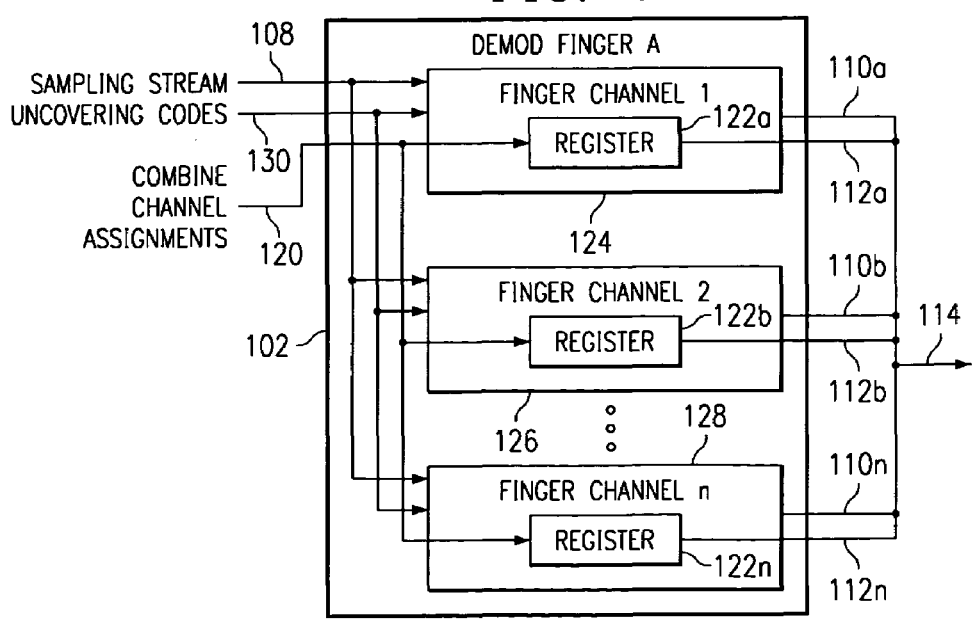
FIG. 4 illustrates a preferred channel register aspect of the invention.

FIG. 4 illustrates a preferred channel register aspect of the invention. Although only demodulating finger A (102) is shown, it is representative of the other demodulating fingers in the plurality of demodulating fingers. In this embodiment, each of the finger channels 124–128 further includes, respectively, channel registers 122*a*, 122*b*, and 122*n*. Each of the finger channels has a combiner channel assignment input connected to the channel register input on line 120 to accept and store a combiner channel assignment. Each combiner channel assignment corresponds to the information channel being demodulated by that finger channel. The demodulating finger channel assignment output is connected to the channel register output of each finger channel. Each finger channel register output supplies the combiner channel assignment corresponding to the demodulated information channel soft symbols being supplied by that particular finger channel.

Each finger channel 124–128 further includes a code input to accept an uncovering code. Typically, one code is provided from a plurality of uncovering codes on line 130, and that one uncovering code corresponds to a particular information channel, from the plurality of information channels. As is well understood, each information channel is associated with one or more Walsh codes which uncover a corresponding information channel in the sample streams. That is, each finger channel 124–128 demodulates an information channel in response to the receipt of a corresponding uncovering code.

Returning briefly to FIG. 3, the system 100 further comprises a controller 132 having an output on line 120 connected to the combiner channel input of each demodulating finger to supply a plurality of combiner channel assignments. A controller 132, although not explicitly shown, can also be included with the embodiment of FIG. 4 as the source of the combiner channel assignments. Again it must be understood that each combiner channel assignment corresponds to an information channel.

FIG. 5 illustrates an exemplary combiner channel map, such as might be used by the controller 132 to organize the assignment of common information channels, through demodulating finger channels, to common combiner channels. Alternately stated, a common information channel among demodulating fingers is assigned to the same combiner channel. As shown, information channel 1, is assigned to combiner channel 1, after processing by demodulating fingers 102–106. Specifically, information channel 1 is being demodulated by: finger channel 1 (124) of demodulating finger A (102); finger channel 2 (142) of demodulating finger B (104); and finger channel n (150) of demodulating finger m (106).

FIG. 6 is a schematic diagram which illustrates the results of the exemplary combiner channel map of FIG. 5. The present invention permits the soft symbols of demodulated information channel 1, which are demodulated by: finger channel 1 (124) of demodulating finger A (102); finger channel 2 (142) of demodulating finger B (104); and finger channel n (150) of demodulating finger m (106), to be combined into combiner channel 1. Note that the aspects of the invention presented in FIGS. 5 and 6 above, apply equally well to the channel register embodiments of both FIGS. 3 and 4.

To further illustrate the invention with examples, it is well known that a carrier signal is received as a plurality of carrier signal variations or delays which correspond to multipath. After down-conversion into a sample stream, the receiver accepts the sample stream, with a plurality of sample stream delays corresponding to the carrier signal multipath delays. Then, selected sample stream delays from the plurality of sample stream delays are processed by corresponding demodulating fingers, selected from the plurality of demodulating fingers. The demodulating fingers assign soft symbols from a common demodulated information channel to the same combiner channels.

Returning to FIGS. 3 and 4, in a more specific example, the sample stream includes a first and a second delay, as well as a first information channel (information channel 1). Demodulating finger A (102) receives the assignment of a first combiner channel (combiner channel 1) to information channel 1. Demodulating finger A (102) demodulates information channel 1 in the sample stream with the first delay and assigns the soft symbols from demodulated information channel 1 to combiner channel 1. Demodulating finger B (104) receives the assignment of combiner channel 1 to information channel 1. Demodulating finger B (104) demodulates information channel 1 in the sample stream with the second delay and assigns soft symbols from the demodulated information channel 1 combiner channel 1.

Alternately, the receiver may accept a plurality of independent sample streams, where the independence is established by the use of different frequency carrier signals. This present example excludes the effects of multipath. These independent sample streams include common information channels. Each independent sample stream is processed or demodulated by a corresponding demodulating finger, from the plurality of demodulating fingers. Each demodulating finger assigns soft symbols from a common demodulated information channel to the same combiner channel. The independent sample streams may include a plurality of common information channels.

More specifically, a first sample stream, independent of a second sample stream is received, with a common first information channel (information channel 1). Demodulating finger A (102) receives the assignment of a first combiner channel (combiner channel 1) to information channel 1. Demodulating finger A (102) demodulates information channel 1 in the first sample stream and assigns soft symbols from information channel 1 to combiner channel 1. Demodulating finger B (104) receives the assignment of combiner channel 1 to information channel 1. Demodulating finger B (104) demodulates information channel 1 in the second sample stream and assigns soft symbols from demodulated information channel 1 to combiner channel 1.

FIG. 7 is a flowchart illustrating a method for combining a plurality of demodulated information channels in a sample stream, in a spread spectrum communications integrated circuit receiver. Although the method is described as a sequence of numbered steps for the purpose of clarity, no order should be inferred from the numbering unless explicitly stated. The method starts at Step 200. Step 202 accepts a sample stream. Step 204 demodulates information channels in the sample stream. Step 206 is a product, where combiner channel assignments are supplied with the soft symbols of the demodulated information channels.

In some aspects of the invention a further step, Step 203a accepts combiner channel assignments, typically a plurality of combiner channel assignments, where each combiner channel assignment corresponds to a particular information channel from the plurality of information channels. Then, supplying combiner channel assignments with soft symbols in Step 206 includes supplying combiner channel assignments, where each combiner channel assignment corresponds to a demodulated information channel.

In some aspects of the invention a further step, Step 203b stores the accepted combiner channel assignments in a register. The supplying of combiner channel assignments in Step 206 includes supplying the combiner channel assignments from the register.

Step 203c accepts an uncovering code, and demodulating information channels in Step 204 includes demodulating an information channel in response to accepting an uncovering code. Typically, the sample stream includes each information channel being modulated with a covering code from a plurality of covering codes. Then, accepting an uncovering code in Step 203c includes accepting an uncovering code corresponding to the information channel to be demodulated.

As explained above, in some aspects of the invention, Step 201a accepts a carrier signal with a plurality of multipath delays. Step 201b converts the carrier signal into a sample stream with a plurality of corresponding delays, so that accepting the sample stream in Step 202 includes accepting a sample stream with a plurality of sample stream delays. Then, Step 203d assigns selected sample stream delays to parallel demodulation paths. Demodulating information channels in Step 204 includes demodulating a common information channel in each parallel demodulation path, and wherein supplying combiner channel assignments with the soft symbols in Step 206 includes supplying combiner channel assignments from each parallel demodulation to the same combiner channel.

FIG. 8 is a flowchart illustrating a variation of the method of FIG. 7. Step 201c accepts a plurality of independent carrier signals including a common information channel. Step 201d converts the plurality of independent carrier signals into corresponding plurality of independent sample streams with a common information channel. Then, accepting a sample stream in Step 202 includes accepting a plurality of independent sample streams with a common information channel. Step 203e assigns each independent sample stream to a parallel demodulation path. Demodulating information channels in Step 204 includes demodulating a common information channel in each parallel demodulation path, supplying combiner channel assignments with the soft symbols in Step 206 includes supplying combiner channel assignments from each parallel demodulation to the same combiner channel.

Returning to FIG. 7, in some aspects of the invention, the receiver includes a plurality of demodulating fingers. Then, accepting the sample stream in Step 202 includes each demodulating finger accepting the sample stream. Demodulating information channels in Step 204 includes each demodulating finger demodulating information channels in the sample stream. Supplying combiner channel assignments with the soft symbols in Step 206 includes each demodulating finger supplying the combiner channel assignments with the soft symbols.

In some aspects of the invention each demodulating finger includes a plurality of finger channels. Then, the supplying combiner channel assignments with the soft symbols in Step 206 includes each finger channel supplying a combiner channel assignment corresponding to the information channel being demodulated.

In some aspects of the invention the receiver includes a controller. Then, accepting combiner channel assignments in Step 203a includes each demodulating finger accepting combiner channel assignments from the controller.

A method for supplying combiner channel assignments, with the soft symbols of corresponding demodulated information channels is described. The grouping of combiner channel assignments with the soft symbols permits the assignment of any information channel, to any finger channel in a demodulating finger, or to any demodulating finger, without additional communications being required between the controller and the combiner. Once the demodulating finger is programmed with a combiner channel assignment for each finger channel, the assignment of finger channel outputs to combiner channels is regulated in the flow of communications between the demodulating finger and the combiner. A system for assigning combiner channels with the soft symbol outputs of a demodulating finger is also provided. Variations include a channel register to store combiner channel assignments that regulate each finger channel in the demodulating finger, or independent registers in each finger channel. Other variations and embodiments of the invention will occur to those skilled in the art

What is claimed is:

1. In a spread spectrum communications integrated circuit receiver supplying combiner channel assignments for a plurality of demodulated information channels in a sample stream, a system comprising:
   a combiner channel assignment input to accept combiner channel assignments; and
   a plurality of demodulating fingers, wherein each demodulating finger has a sample stream input to accept a sample stream, a soft symbol output to supply soft symbols associated with demodulated information channels, and a combiner channel assignment output to supply combiner channel assignments for associated soft symbols, wherein the demodulating finger combiner channel assignment output assigns combiner channels to associated soft symbols in response to accepted combiner channel assignments.

2. The system of claim 1 wherein each demodulating finger further includes:
   at least one channel register having an input connected to the demodulating finger combiner channel assignment input to accept combiner channel assignments and an output connected to the demodulating finger combiner channel assignment output to supply stored combiner channel assignments.

3. The system of claim 2 wherein each demodulating finger demodulates a plurality of information channels; and
   wherein each demodulating finger supplies combiner channel assignments for the soft symbols from the plurality of demodulated information channels.

4. The system of claim 3 wherein each demodulating finger further includes:
   a plurality of finger channels;
   wherein each finger channel includes a sample stream input coupled to the demodulating finger sample stream input to accept the sample stream and a soft symbol output connected to the demodulating finger soft symbols output to supply soft symbols from a demodulated information channel.

5. The system of claim 4 wherein each finger channel further includes a channel register, each finger channel having a combiner channel assignment input connected to the channel register input to accept and store a combiner channel assignment.

6. The system of claim 5 wherein each demodulating finger combiner channel assignment output is coupled to the channel register output of each finger channel to supply the combiner channel assignment corresponding to the demodulated information channel soft symbols.

7. The system of claim 6 wherein each finger channel further includes a code input to accept an uncovering code, each finger channel demodulating an information channel in response to the receipt of a corresponding uncovering code.

8. The system of claim 1 further comprising:
   a controller having an output connected to the combiner channel assignment input of each demodulating finger to supply combiner channel assignments.

9. The system of claim 1 in which the receiver accepts a carrier signal, with a plurality of multipath delays, that is converted into a sample stream with a corresponding plurality of sample stream delays,
   wherein selected sample stream delays are assigned to corresponding demodulating fingers; and
   wherein common information channels from each sample stream delay are demodulated by the corresponding demodulating fingers into soft symbols which are assigned to common combiner channels.

10. The system of claim 9 in which the sample stream includes a first and a second delay, and also includes a first information channel;
    wherein a first demodulating finger receives the assignment of a first combiner channel to the first information channel, the first demodulating finger demodulating the first information channel in the sample stream with the first delay and assigning soft symbols from the demodulated first information channel to the first combiner channel; and
    wherein a second demodulating finger receives the assignment of the first combiner channel to the first information channel, the second demodulating finger demodulating the first information channel in the sample stream with the second delay and assigning soft symbols from the demodulated first information channel to the first combiner channel.

11. The system of claim 1 in which the receiver accepts a plurality of independent sample streams including common information channels;
    wherein each sample stream from the plurality of independent sample streams is assigned to a corresponding demodulating finger from the plurality of demodulating fingers; and
    wherein common information channels from each independent sample stream are demodulated by the corresponding demodulating fingers into soft symbols which are assigned to common combiner channels.

12. The system of claim 11 in which a first sample stream, independent of a second sample stream, is included, with a common first information channel;
    wherein a first demodulating finger receives the assignment of a first combiner channel to the first information channel, the first demodulating finger demodulating the first information channel in the first sample stream and assigning soft symbols from the demodulated first information channel to the first combiner channel; and
    wherein a second demodulating finger receives the assignment of the first combiner channel to the first information channel, the second demodulating finger demodulating the first information channel in the second sample stream and assigning soft symbols from the demodulated first information channel to the first combiner channel.

13. In a spread spectrum communications demodulating finger integrated circuit to supply combiner channel assignments for a plurality of demodulated information channels in a sample stream, the demodulating finger comprising:
    a combiner channel assignment input to accept combiner channel assignments;
    a sample stream input to accept a sample stream;
    a soft symbol output to supply soft symbols from demodulated information channels; and
    a combiner channel assignment output to supply combiner channel assignments for the soft symbols wherein the combiner channel assignment output assigns combiner channels for soft symbols in response to accepting combiner channel assignments.

14. The demodulating finger of claim 13 further comprising:
    at least one channel register having an input connected to the demodulating finger combiner channel assignment input to accept combiner channel assignments and an output connected to the demodulating finger combiner channel assignment output to supply stored combiner channel assignments.

15. The demodulating finger of claim 14 wherein the demodulating finger supplies a plurality of combiner channel assignments, with each combiner channel assignment corresponding to information channels from the plurality of information channels.

16. The demodulating finger of claim 15 further comprising:
    a plurality of finger channels;
    wherein each finger channel includes a sample stream input coupled to the demodulating finger sample stream input to accept the sample stream and a soft symbol output connected to the demodulating finger soft symbol output to supply soft symbols from a demodulated information channel.

17. The demodulating finger of claim 16 wherein each finger channel further includes a channel register, each finger channel having a combiner channel assignment input connected to the channel register input to accept and store a combiner channel assignment corresponding to the information channel being demodulated by that finger channel.

18. The demodulating finger of claim 17 wherein each demodulating finger further includes an output connected to the channel register output to supply the combiner channel assignment corresponding to the demodulated information channel soft symbols.

19. The demodulating finger of claim 18 wherein each finger channel further includes a code input to accept an uncovering code corresponding to an information channel, each finger channel demodulating an information channel from the plurality of information channels in response to the received uncovering code.

20. In a spread spectrum communications integrated circuit receiver, a method for supplying combiner channel assignments for a plurality of demodulated information channels in a sample stream, the method comprising:
   accepting a sample stream:
   demodulating information channels in the sample stream; and
   supplying combiner channel assignments with soft symbols of the demodulated information channels, including supplying combiner channel assignments corresponding to demodulated information channels;
   accepting combiner channel assignments;
   storing combiner channel assignments in a register; and
   wherein supplying combiner channel assignments includes supplying the combiner channel assignments from the register.

21. The method of claim 20 further comprising:
   accepting an uncovering code; and
   wherein demodulating information channels includes demodulating an information channel in response to accepting an uncovering code.

22. The method of claim 21 in which the sample stream includes each information channel being covered with a Walsh code from a plurality of Walsh codes; and
   wherein accepting an uncovering code includes accepting an uncovering code corresponding to the information channel to be demodulated.

23. The method of claim 20 in which the integrated circuit receiver includes a plurality of demodulating fingers; and
   wherein accepting the sample stream includes each demodulating finger accepting the sample stream;
   wherein demodulating information channels includes each demodulating finger demodulating information channels in the sample stream; and
   supplying combiner channel assignments with the soft symbols includes each demodulating finger supplying the combiner channel assignments with the soft symbols.

24. The method of claim 23 in which each demodulating finger includes a plurality of finger channels; and
   wherein supplying combiner channel assignments with the soft symbols includes each finger channel supplying a combiner channel assignment corresponding to the information channel being demodulated.

25. The method of claim 24 in which the integrated circuit receiver includes a controller; and
   wherein accepting combiner channel assignments includes each demodulating finger accepting combiner channel assignments from the controller.

26. In a spread spectrum communications integrated circuit receiver, a method for supplying combiner channel assignments for a plurality of demodulated information channels in a sample stream, the method comprising:
   accepting a sample stream:
   demodulating information channels in the sample stream; and
   supplying combiner channel assignments with soft symbols of the demodulated information channels, including supplying combiner channel assignments corresponding to demodulated information channels;
   accepting combiner channel assignments;
   accepting a carrier signal with a plurality of multipath delays;
   converting the carrier signal into a sample stream with a plurality of corresponding delays; and
   wherein accepting the sample stream includes accepting a sample stream with a plurality of sample stream delays; and
   the method further comprising:
   assigning selected sample stream delays to parallel demodulation paths;
   wherein demodulating information channels includes demodulating a common information channel in each parallel demodulation path; and
   wherein supplying combiner channel assignments with the soft symbols includes supplying combiner channel assignments from each parallel demodulation path to the same combiner channel.

27. In a spread spectrum communications integrated circuit receiver, a method for supplying combiner channel assignments for a plurality of demodulated information channels in a sample stream, the method comprising:
   accepting a sample stream,
   demodulating information channels in the sample stream; and
   supplying combiner channel assignments with soft symbols of the demodulated information channels, including supplying combiner channel assignments corresponding to demodulated information channels;
   accepting combiner channel assignments;
   accepting a plurality of independent carrier signals including a common information channel;
   converting the plurality of independent carrier signals into a corresponding plurality of independent sample streams including a common information channel, and
   wherein accepting a sample stream includes accepting a plurality of independent sample streams with a common information channel; and
   the method further comprising:
   assigning each independent sample stream to a parallel demodulation path;
   wherein demodulating information channels includes demodulating a common information channel in each parallel demodulation path; and
   wherein supplying combiner channel assignments with the soft symbols includes supplying combiner channel assignments from each parallel demodulation to the same combiner channel.

* * * * *